(12) United States Patent
Ji et al.

(10) Patent No.: US 8,989,197 B2
(45) Date of Patent: Mar. 24, 2015

(54) RECONFIGURABLE BRANCHING UNIT FOR SUBMARINE OPTICAL COMMUNICATION NETWORKS

(71) Applicants: NEC Laboratories America, Inc., Princeton, NJ (US); NEC Corporation, Tokyo (JP)

(72) Inventors: Philip N. Ji, Plainsboro, NJ (US); Ryuji Aida, Tokyo (JP); Ting Wang, West Windsor, NJ (US)

(73) Assignees: NEC Laboratories America, Inc., Princeton, NJ (US); NEC Corporation, Tokyo (JP)

( * ) Notice: Subject to any disclaimer, the term of this patent is extended or adjusted under 35 U.S.C. 154(b) by 134 days.

(21) Appl. No.: 13/855,446

(22) Filed: Apr. 2, 2013

(65) Prior Publication Data

US 2013/0259055 A1    Oct. 3, 2013

Related U.S. Application Data

(60) Provisional application No. 61/618,910, filed on Apr. 2, 2012.

(51) Int. Cl.
*H04L 12/28* (2006.01)
*H04Q 11/00* (2006.01)

(52) U.S. Cl.
CPC ............ *H04Q 11/0005* (2013.01); *H04L 12/28* (2013.01); *H04Q 11/00* (2013.01); *H04Q 2011/0016* (2013.01)
USPC ........................................................ 370/400

(58) Field of Classification Search
CPC ................. H04Q 11/0005; H04Q 2011/0016; H04Q 11/00; H04L 12/28
USPC ........................................................ 370/400
See application file for complete search history.

(56) References Cited

U.S. PATENT DOCUMENTS

| 6,249,620 B1 * | 6/2001 | Simeonidou et al. ........... 385/16 |
| 2002/0089721 A1 * | 7/2002 | Nicolas ......................... 359/128 |
| 2011/0200322 A1 | 8/2011 | Kovsh et al. |

OTHER PUBLICATIONS

K. Christodoulopoulos, I. Tomkos, and E. Varvarigos, "Spectrally/ Bitrate Flexible Optical Network Planning", Proc. ECOC 2010, Sep. 19-23, 3 pages, We.8.D.3, Tornio, Italy.

(Continued)

*Primary Examiner* — Sai-Ming Chan
(74) *Attorney, Agent, or Firm* — Joseph Kolodka

(57) ABSTRACT

Methods and systems for optical communication in a submarine network are provided. An input signal is received from a terminal at a reconfigurable branching unit (BU), wherein the BU enables bidirectional transmission between any two terminals, and the input signal is demultiplexed into at least one individual waveband or wavelength using at least one demultiplexer. Each demultiplexed waveband is passed through optical switches, with corresponding optical switches for the same demultiplexed waveband provided for transmission in the reverse direction. Independent per-waveband switching is performed using a demultiplexer-switch-multiplexer (DSM) architecture. Each demultiplexed waveband is multiplexed at each output port using at least one multiplexer to combine signals from different sources, and combined signals are transmitted to a destination terminal.

14 Claims, 6 Drawing Sheets

(56) References Cited

OTHER PUBLICATIONS

P. N. Ji, M.-F. Huang, et al., "Reconfigurable Waveband Cross-Connect and Its Application in 112 Gb/s WDM System", Optical Society of America/OFC/NFOEC, Mar. 2009, 3 Pages, NEC Laboratories America, Princeton, New Jersey.

M. Jinno, H. Takara, et al., "Demonstration of Novel Spectrum-Efficient Elastic Optical Path Network With Per-Channel Variable Capacity of 40 Gb/s to over 400 Gb/s," Proc. ECOC 2008, Sep. 21-25, 2008, 2 Pages, Th.3.F.6, Brussels Belgium.

A.N. Patel, P. N. Ji, et al., "Routing, Wavelength Assignment, and Spectrum Allocation in Transparent Flexible Optical WDM (FWDM) Networks", Optical Society of America/IPR/PS, Jul. 2012, 3 Pages, NEC Laboratories America, Princeton, New Jersey.

T. Wang, P. N. Ji, et al., "Novel Flexible Band Tunable Filter", NEC Laboratories America, Inc., Technical Report, Sep. 20, 2003, pp. 1-36, 2003-L103, Princeton, New York.

\* cited by examiner

RECONFIGURABLE BRANCHING UNIT FOR SUBMARINE OPTICAL COMMUNICATION NETWORKS

RELATED APPLICATION INFORMATION

This application claims priority to provisional application Ser. No. 61/618,910 filed on Apr. 2, 2012, the entirety of which is herein incorporated by reference. This application is related to co-pending U.S. application Ser. No. 13/855,384, which is filed concurrently herewith and herein incorporated by reference.

BACKGROUND

1. Technical Field

The present invention relates to submarine communication networks, and more particularly, to submarine optical communication networks with reconfigurable branching units.

2. Description of the Related Art

Submarine optical networks for the backbone of global communication networks. They connect the telecommunication and data communication traffics among different continents. Together with the terrestrial networks, the submarine optical networks provide the pipeline for the users from different locations in the world to communicate with one another. Besides providing communication between continents, the submarine optical networks are also used to establish connection between islands or provide communication among coastal cities (instead of laying fiber underground on land and setting up terrestrial fiber links.)

Comparing with terrestrial optical networks, submarine networks usually have higher capacity. Because there are fewer resources (fewer fibers) in the submarine networks due to higher equipment and deployment cost, more traffic is aggregated into each fiber. This becomes more significant as the global traffic demand creases exponentially as a result of the growing Internet services. Submarine optical networks usually consist of main trunks that connect the trunk terminals, which are point-to-point cable links with in-line optical amplifiers to boost the signal power, and branch path that connect to other branch terminals. A branching unit (BU) is a network element that splits the signal between the main trunk and the branch path and vice versa. This allows the signals from different paths to share the same fiber, instead of installing dedicate fiber pairs for each link.

A drawback of using conventional BU's in a submarine network is that conventional BU's employ a pre-determined, fixed wavelength arrangement; and therefore no reconfiguration is possible during normal use. As the submarine network traffic becomes more dynamic, and Internet-based traffic becomes more dominant, the pre-determined, fixed wavelength assignment will not always be optimum. Upgrades or reconfigurations may be required after deployment, and upgrades or reconfigurations are very difficult to perform using conventional BU's since the equipment is under the sea. Another problem with upgrading or reconfiguring conventional BU's in a submarine network is that long periods of interruption to existing traffic will occur during any upgrades or reconfigurations, which may affect an extremely large amount of users across multiple continents.

One technique which attempts to reconfigure BU architectures involves changing the fixed wavelength optical filters in a BU to tunable filters. By changing the passband and stop band wavelengths, different amount of optical spectrum can be passed to different terminals according to the requirement. However, a major disadvantage of the tunable based BU is that tunable optical filters have fixed passband width; therefore the amount of spectrum for each path is also fixed and cannot be changed by tuning, even though the center of the passband can be shifted. This significantly reduces the reconfiguration capability. Tunable optical filters with the tunability at both the center frequency and the passband width have been proposed to increase the reconfiguration ability. However, even though the passband width can be set dynamically, the passband has to be contiguous, similar to all other optical filters. This also limits the reconfigurability of the spectrum usage among different paths.

Therefore, there is a need for the next generation of submarine network BU's to have reconfigurability in wavelength assignments, with readily reconfigurable BU's as a key enabling element. This reconfigurability will also help to maintain the submarine link at the optimal operation condition when the transmitted signal upgrades (such as increase the channel data rate or using more advanced modulation formats, which might require new channel spacing or mixed channel widths). Furthermore, due to the physical location and environment, the time and effort to repair damages in submarine networks is much greater than in the terrestrial network. Thus, there is a need for optical switches in the BU's to have a latching feature, which means that the switches will maintain their switching setting even after the power is turned off or cut. This latching feature also reduces the power consumption in the BU, which is highly desirable.

SUMMARY

In accordance with the present principles, a method for optical communication is provided, comprising: receiving an input signal from a terminal at a reconfigurable branching unit (BU); splitting the input signal into at least two parts, with one part being associated with one or more trunk terminals and another part being associated with one or more branch terminals; selecting and individually switching each of one or more spectrum channels to one of a plurality of paths using at least one wavelength selective switch (WSS), with the at least one WSS being configured to transmit the one or more spectrum channels to their respective target output port; combining signals switched to a specific port into a wavelength division multiplexing (WDM) signal using the WSS, and sending the WDM signal to an output port; and filtering out individual spectrum channels using at least one wavelength blocker (WB).

In accordance with the present principles, a system for optical communication is provided, comprising: a reconfigurable branching unit (BU) configured to receive an input signal from a terminal; a splitter configured to split the input signal into at least two parts, with one part being associated with one or more trunk terminals and another part being associated with one or more branch terminals; at least one wavelength selective switch (WSS) configured to select and individually switch each of one or more spectrum channels to one of a plurality of paths, wherein the at least one WSS is configured to transmit the one or more spectrum channels to their respective target output port, wherein the at least one WSS is configured to combine signals switched to a specific port into a wavelength division multiplexing (WDM) signal, and to send the WDM signal to an output port; and at least one wavelength blocker (WB) configured to filter out individual spectrum channels.

In accordance with the present principles, a reconfigurable branching unit for underwater optical communication is provided, comprising: a receiver configured to receive a wavelength division multiplexed (WDM) signal from a terminal; a splitter configured to split the input signal into at least two parts, with one part being associated with one or more trunk terminals and another part being associated with one or more branch terminals; at least one wavelength selective switch (WSS) configured to select and individually switch each of one or more spectrum channels to one of a plurality of paths, wherein the at least one WSS is configured to transmit the one or more spectrum channels to their respective target output port, wherein the at least one WSS is configured to combine signals switched to a specific port into a wavelength division multiplexing (WDM) signal, and to send the WDM signal to an output port; at least one wavelength blocker (WB) configured to filter out individual spectrum channels; and at least one dual bidirectional fiber pair between the branching unit and a branch terminal.

In accordance with the present principles, a method for optical communication is provided, comprising: receiving an input signal from a terminal at a reconfigurable branching unit (BU), wherein the BU enables bidirectional transmission between any two terminals; demultiplexing the input signal into at least one individual waveband using at least one demultiplexer; passing each demultiplexed waveband through two or more 2×2 optical switches, with two or more corresponding 2×2 optical switches for the same demultiplexed waveband provided for transmission in the reverse direction, wherein the optical switches are interlinked, operate concurrently, and have the same switching state; performing independent per-waveband switching using a demultiplexer-switch-multiplexer (DSM) architecture; and multiplexing each demultiplexed waveband at each output port using at least one multiplexer to combine signals from different sources, and transmitting combined signals to a destination terminal.

In accordance with the present principles, a system for optical communication is provided, comprising: a reconfigurable branching unit (BU), configured to receive an input signal from a terminal, wherein the BU enables bidirectional transmission between any two terminals; at least one demultiplexer configured to demultiplex the input signal into at least one individual waveband; two or more 2×2 optical switches configured to pass each demultiplexed waveband through the two or more 2×2 optical switches, with two or more corresponding 2×2 optical switches for the same demultiplexed waveband provided for transmission in the reverse direction, wherein the optical switches are interlinked, operate concurrently, and have the same switching state; a demultiplexer-switch-multiplexer (DSM) architecture configured to perform independent per-waveband switching; and at least one multiplexer configured to combine signals from different sources by multiplexing each demultiplexed waveband at each output port, and transmitting combined signals to a destination terminal.

In accordance with the present principles, a method for optical communication is provided, comprising: receiving an input signal from a terminal at a reconfigurable branching unit (BU); splitting the input signal into at least two paths using at least one 1:2 optical splitter; demultiplexing the input signal into at least one individual waveband using at least one demultiplexer; selecting and filtering channels of interest of the input signal using a waveband blocker (WB); passing each demultiplexed waveband through at least one 1×2 optical switch, with at least one corresponding 1×2 optical switch being provided for transmission of the same demultiplexed waveband in the reverse direction; performing independent per-waveband switching using a combined split-and-select (S&S) and demultiplexer-switch-multiplexer (DSM) architecture; and multiplexing each demultiplexed waveband using at least one multiplexer to combine wavebands from different sources into a wavelength division multiplexed (WDM) signal, and transmitting the WDM signal to a destination terminal.

In accordance with the present principles, a system for optical communication is provided, comprising: a reconfigurable branching unit (BU) configured to receive an input signal from a terminal; at least one 1:2 optical splitter configured to split the input signal into at least two paths; at least one demultiplexer configured to demultiplex the input signal into at least one individual waveband; a waveband blocker (WB) configured to select and filter channels of interest of the input signal; at least one 2×1 optical switch configured to pass each demultiplexed waveband through, with at least one corresponding 2×1 optical switch being provided for transmission of the same demultiplexed waveband in the reverse direction; a combined split-and-select (S&S) and demultiplexer-switch-multiplexer (DSM) architecture configured to perform independent per-waveband switching; and another multiplexer configured to multiplex each demultiplexed waveband by combining wavebands from different sources into a wavelength division multiplexed (WDM) signal, and transmitting the WDM signal to a destination terminal.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
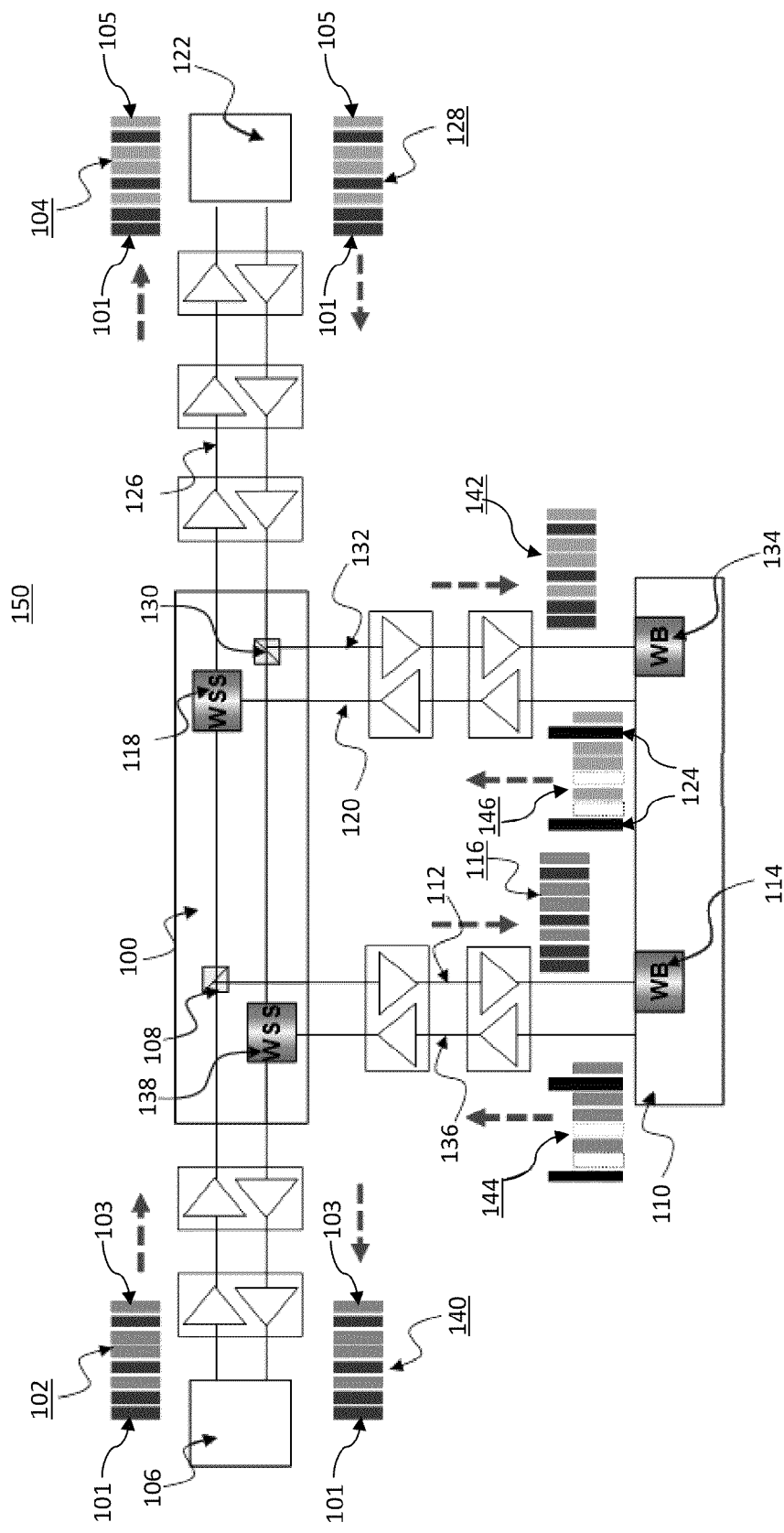
FIG. 1 shows a wavelength-selective switch (WSS) based reconfigurable branching unit (BU) system in accordance with an embodiment of the present principles.

In accordance with the present principles, a submarine optical communication network with reconfigurable branching units (BUs) is provided. The traffic in the global submarine optical network is becoming more dynamic. As a result, reconfigurability is desirable for the next generation submarine network branching unit. Comparing to the reconfigurable optical add/drop multiplexers used in the terrestrial network, the branching unit for submarine network have additional requirements such as latching operation and amplifier power balancing. While it is contemplated that various BU architectures may be employed according to the present principles, three (3) illustrative reconfigurable branching unit architectures will be discussed herein.

The WSS-based reconfigurable BU architecture offers the highest level of reconfigurability; but it does not employ a latching feature. The other two architectures, namely the bidirectional distributed shared memory (DSM) architecture and the split-and-select (S&S)+DSM architecture, can be constructed using commercially available latching components with mature technologies. They can be implemented in the wavelength level with high reconfigurability with a relatively large footprint, or in the waveband level with lower reconfigurability and a reduced footprint. Besides improved reconfigurability compared to the existing solutions, these architectures also offer unique features such as flexible grid operation, reuse of wavelength in two "trunk terminal to branch terminal" links, and multicasting capability. These architectures greatly improve the switching flexibility in next generation BU architectures for the increasingly dynamic global submarine optical networks.

WSS and/or WB have been used in terrestrial reconfigurable optical add/drop multiplexer (ROADM) nodes, which perform similar add/drop function as the submarine network BU. However there are several key differences between the WSS-based terrestrial network ROADM and the present invention. For example, in one embodiment according to the present principles, the BU architecture offers reuse of wavelength/spectrum between the two bidirectional "Trunk Terminal to Branch Terminal" paths by employing double fiber pairs between the BU and the Branch Terminal. The present principles allow dummy light for amplifier power balancing, which is not provided by a terrestrial ROADM network. Furthermore, there may be differences in the function and emphasis between the Trunk Terminals and the Branch Terminals in the submarine network according to the present principles, whereas all nodes in the terrestrial ROADM network are treated equally. Another difference is that in terrestrial ROADM, the add/drop operations are processed locally and the transponders are located near the ROADM node. However, in submarine network according to the present principles, add/drop signals may be sent to a Branch Terminal that is on land while the BU is located undersea. Therefore the transponders are far away from the BU, and as such, amplified optical paths are employed between them and power balancing issues may arise. Besides that, the requirement of compact size, low power consumption, high reliability (due to difficulty in underwater fault detection and repair), etc. are unique to submarine BU, and the submarine optical communication networks with reconfigurable BUs according to the present principles addresses these unique needs.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a reconfigurable BU based architecture 150 which includes a wavelength-selective switch (WSS) and wavelength blocker (WB) is illustratively shown in one embodiment according to the present principles.

A WSS is an optical device that integrates demultiplexing, switching and multiplexing functions within a monolithic unit. An input wavelength division multiplexing (WDM) signal may be dispersed along the wavelength (frequency) axis by a dispersive device such as optical grating and hit an array of optical switches. Each WDM channel (or wavelength slot) may have a dedicated switch. The switch may be controlled, and employed to send the respective channel (or wavelength slot) to its target output port. At the device output, the signals switched to this port may be combined by another dispersive device into a WDM signal and sent to an output port. A 1×N WSS can also be operated in the reverse direction to act as an N×1 WSS. When N=1, the WSS is known as a wavelength blocker. Furthermore, besides switching and blocking functions, WSS and WB also may provide attenuation functions for each optical channel.

In one embodiment, a WSS-based reconfigurable BU 100 is employed according to the present principles. In one embodiment, a signal is represented by the spectrum 102, with each bar representing one channel (A-B signals 101 represent the channels between Trunk Terminals A and B; A-C signals 103 represent the channels between Trunk Terminal A and Branch Terminal C; and B-C signals 105 represent channels between Trunk Terminal B and Branch Terminal C. When the signal 102 from Trunk Terminal A 106 enters the BU 100, it may be split into two paths by an optical splitter 108. One path is sent to the Branch Terminal C 110 through a branch path 112. At the input of the Branch Terminal C 110, a wavelength blocker (WB) 114 may be employed to filter out the channels from Trunk Terminal A 106 that should not be dropped to the branch (such as those represented by spectra 116 and 142). The other path is sent to Input 1 of a 2×1 WSS 118 inside the BU 100. The signals at Input 2 of the WSS 118 come from Branch Terminal C 110 through path 120. They contain the signals to be sent to destination Trunk Terminal B 122, and dummy lights 124. The WSS 118 filters out the unnecessary dummy lights 124, selects the appropriate channels from Trunk Terminal A 106 and from Branch Terminal C 110, respectively, and sends the combined WDM signal 104 to Trunk Terminal B 122 through the main trunk path 126. The WSS 118 may also perform optical power equalization among the WDM channels.

Similarly, in one embodiment according to the present principles, the input signal 128 from Trunk Terminal B 122 is split first by a splitter 130. One path is sent to Branch Terminal C 110 through path 132 and may be received after selection by a WB 134, and the other path is combined with the "Terminal C to Terminal A" signal (arriving from path 136 through a 2×1 WSS 138 inside the BU 100 to form the WDM signal 140 for the destination Trunk Terminal A 106. In one embodiment, at Branch Terminal C 110, corresponding return channels (e.g., A-C, B-C, etc.) are combined with some dummy light to form signals (e.g., spectra 144 and 146), and are sent back to the BU 100. The dummy light may be employed to maintain the same total power in the fiber and may be filtered out at the BU 100 and combined with the returned channels (e.g., A-B) from Trunk Terminal B 122 and sent back to Trunk Terminal A 106. The signals in reverse paths operate at the similar way. While the above architecture is illustratively shown, it is contemplated that other sorts of hardware and configurations may also be employed according to the present principles.

Due to the flexible channel selection in the WSS (118, 138) and the WB (114, 134), the WDM spectrum in these paths can be dynamically allocated for different links (i.e., A-B, A-C, and B-C) according to the traffic demands and network requirements. There is no restriction which requires employing contiguous channels in the same path. For example, in one embodiment according to the present principles, the quantity of the channel allocation combination can be $2^k$ where k is the number of WDM channels in the system, which can be from 40 to 160 or even higher. This is significantly larger than the 16 (or even 128) configurations achievable by conventional BU architectures. In fact, $2^k$ is the maximum number of configurations achievable on this system without considering multicasting. In an example of a typical WDM system, there are 80 channels with 50 GHz spacing within the C-band spectrum. This architecture can deliver $>1.2 \times 10^{24}$ different configurations, which is much higher than ~16 in conventional BU architectures.

In one embodiment according to the present principles, this architecture may be categorized as a split-and-select (S&S) architecture because of the usage of a splitter (108, 130), and as such, WB and/or WSS multicasting may be easily achieved. For example, the same channel may be sent to both a trunk path (e.g., 126) and a branch path (e.g., 112) by controlling and directing a WB (e.g., 114) and a WSS (e.g., 118) to pass through a channel simultaneously. When considering multicasting cases, even more channel allocation combinations may be obtained than when multicasting is not employed.

In one embodiment according to the present principles no latching is necessary when employing WSS and/or WB architecture. It is possible to build a subsystem using array of 2×1 latching optical switches to deliver latching 2×1 WSS-like function, however this would employ a large footprint, high fiber count and relatively high optical loss. Monolithic solutions such as WSS and WB are preferred to latching products in this embodiment. In this architecture, the latching feature in the WB is not critical, because the WB's are located at the terminal site and not in the submerged BU, and therefore may be serviced more easily and can more easily have a sufficient power supply. Since the required port count of the WSS in this architecture is only 2×1, the device size can be small, and commercially available WSS devices (including twin devices, where two WSS devices are packaged inside one unit, further reducing the hardware size), may be employed according to the present principles. It is noted that the physical size of the WB may be even smaller than the physical size of the WSS devices.

In one embodiment according to the present principles, WSS and WB devices may be employed; and therefore, each channel may be switched individually to any path, thereby significantly improving the number of configurations that may be achieved in a BU. Furthermore, in one embodiment, the BU is flexible grid operation ready, and it also supports the reuse of wavelength/spectrum between the "Trunk Terminal to Branch Terminal" paths. A flexible grid network (also called gridless network or elastic network) removes the restriction of 100 GHz or 50 GHz channel grid in ITU-T standard and allows flexible assignment of spectra to each channel according to the individual need, which may also be changed over time. This feature helps to improve the spectrum resource usage and allows better operation of the system. Having this flexibility also ensures that the network is future proof, as the spectrum requirement for the WDM channel might be changed due to the progress in transmission technologies, such as having advanced modulation techniques or multiplexing schemes.

For example, in one embodiment, the flexible grid function may be implemented by employing one of the various WSS switching technologies which are currently commercially available. WSS switching technologies which achieve flexible grid operation preferably employ small pixels on the switching plane, which can be easily reconfigured to customize each passband width. Liquid crystal-based WSS/WB may also be employed to reduce the grid size and deliver finer grid operation according to one embodiment. Due to the increasing complexity when the channel grid resolution becomes too small, a fine grid system rather than a truly flexible grid system may be advantageously employed. Thus, liquid crystal-based WSS/WB can also be used for the flexible grid reconfigurable BU.

Aside from the basic add/drop operations, additional functions (e.g., optical power monitoring and equalization), may be achieved using the present principles by adding relevant devices. This architecture may also be reconfigured to add redundant components for protection purpose, or be reconfigured for BU with higher port count (i.e., connecting to more branch terminals). Other features according to various embodiments of the present principles include employing dual bidirectional fiber pairs between the BU and the Branch Terminal; employing independent switching on individual channels (no need to be contiguous), therefore offering a very high level of reconfigurability; reusing the wavelength/spectrum between the bidirectional paths between Trunk Terminals and Branch Terminals; providing power balancing for amplifiers; multicasting of signals; and performing optical power equalization through WSS and WB.

Figure 2:
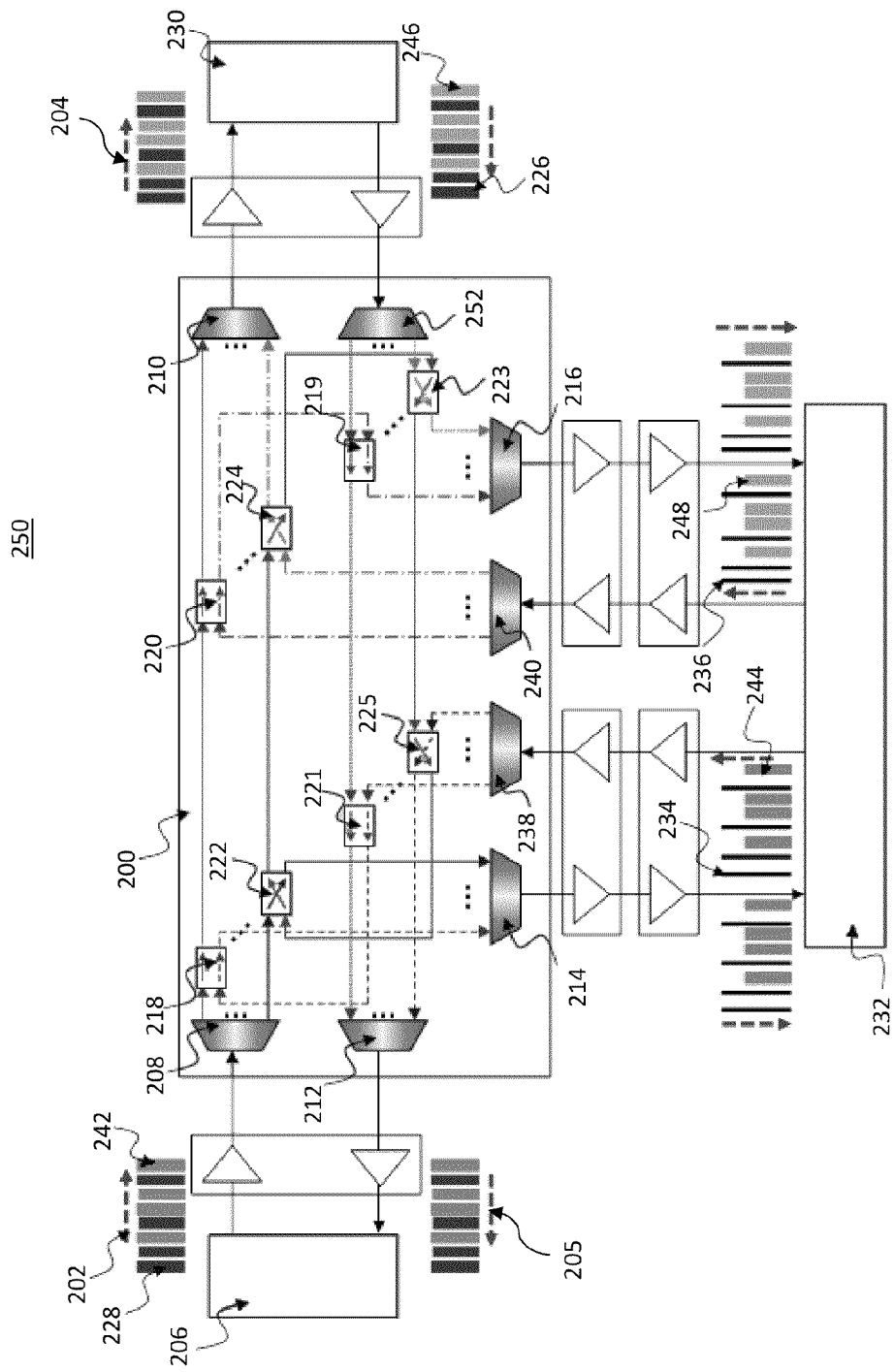
FIG. 2 shows a bidirectional demultiplexer-switch-multiplexer (DSM) based reconfigurable branching unit (BU) in accordance with an embodiment of the present principles.

Referring now to FIG. 2, a demultiplexer-switch-multiplexer (DSM) architecture 250 is illustratively shown in one embodiment according to the present principles. Employment of DSM architecture enables independent per-wavelength or per-waveband switching, and therefore offers reconfigurability at a level much higher than conventional architectures. This architecture may be constructed by employing latching or static devices for the BU, thus enabling latching features in the BU. Through the intelligent connection between bidirectional paths, dummy light may be reused for amplified power balancing. Furthermore, waveband may be employed, which reduces the hardware quantity and footprint while concurrently enabling flexible grid operation.

In one embodiment according to the present principles, an input optical signal 202 may arrive at a BU 200 from Trunk Terminal A 206. The signal 202 may then be demultiplexed into individual channels or wavebands by employing a fixed wavelength/waveband demultiplexer 208. Corresponding wavelength/waveband multiplexers 210, 212, 214, 216 may be employed at each output port to combine signals from different sources. Corresponding demultiplexers 238, 240, and 252 may also be employed. Because of limitations in hardware size in the BU 202, it is desirable to employ waveband instead of wavelength to reduce the demultiplexer port count and the quantity of optical switches. As such, we will discuss only the waveband switching option hereinafter for simplicity, unless otherwise stated. However, it is contemplated that the present principles advantageously apply to both waveband level and wavelength level operations.

In one embodiment according to the present principles, for example, when employing the waveband option, the optical signals within the same band may be switched together and are not treated individually until reaching the destination terminal. The channels at each waveband may be assigned contiguously or in periodic fashion, and non-uniform wavebands may also be used to improve aggregation efficiency, as long as other waveband multiplexers/demultiplexers in the BU 200 have the same waveband assignment configuration. Using waveband also provides the potential for flexible grid network operation. Even though the waveband demultiplexer/multiplexer is a passive static device with a fixed, pre-determined wavelength (waveband demultiplexer/multiplexer with flexible waveband assignment can be constructed using similar technology as flexible grid WSS, but they are very costly and not mature, therefore we will not discuss them here), the channels within the waveband may be flexibly arranged according to the present principles. For example, if a waveband contains 400 GHz spectrum, it may include 8 channels at 50 GHz spacing, or 12 channels at 33 GHz spacing, or 4 channels at 100 GHz spacing, or 1 channel at 150 GHz spacing plus 3 channels at 33 GHz spacing plus 3 channels at 50 GHz spacing, etc. Therefore the reconfigurable BU is flexible grid ready.

In one embodiment, the DSM reconfigurable BU architecture employs a bidirectional BU, which enables bidirectional transmission between any two terminals (such as A⇔B, A⇔C, and B⇔C), and ensures optical power balancing on all fiber paths. At the output of the demultiplexer 208 from Trunk Terminal A 206, each demultiplexed waveband may pass through two 2×2 optical switches in cascade (e.g., 218/220, and 222/224). There may also be two corresponding 2×2 optical switches for the same waveband in the reverse direction (e.g., 219/221, and 223/225). In one embodiment, these four 2×2 optical switches for each waveband (e.g., 218/220/222/224 for the first waveband, and 219/221/223/225 for the last waveband) operate concurrently and have the same switching state. While the above architecture and switch configuration is illustratively shown, it is contemplated that other sorts of hardware, architectures, and configurations may also be employed according to the present principles.

In one embodiment according to the present principles, when a set of four 2×2 optical switches for one demultiplexed waveband are all switched to the bar state (i.e., the through state), the corresponding waveband communicates between the two Trunk Terminals 206, 230. This operation is illustrated on the first waveband on FIG. 2. Here, the demultiplexed input waveband 228 (i.e., the first band) from Trunk Terminal A is switched by the first 2×2 optical switch 218 to the second 2×2 optical switch 220 along the path indicated by the arrows, and the second 2×2 optical switch 220 in turn switches the signal to the waveband multiplexer 210 at the output of the reconfigurable BU 200, which combines it with other signals for Trunk Terminal B 230 and sends the signal 204 to the destination Trunk Terminal B 230. On the reverse path (from B to A), a similar operation may be performed. The demultiplexed waveband 226 from Trunk Terminal B 230 is switched by the two reserve path 2×2 optical switches 219, 221 at the bar state to the waveband multiplexer 212 for Trunk Terminal A 206 along the path indicated by dotted arrows, and is then a signal 205 may be sent to destination Trunk Terminal A 206.

In the above embodiment, since the above-mentioned waveband is used for communication between the two Trunk Terminals 206, 230, it is no longer available for communication between the Trunk Terminals 206, 230 and the Branch Terminal. Therefore dummy lights 234, 236 may be employed at the corresponding waveband from the transmitters in the Branch Terminal C 232. After demultiplexing by the waveband demultiplexer 238 for the first input from Branch Terminal C, the dummy light 234 from the "C to A" transmitter is switched by a reverse path 2×2 optical switch 221 to the corresponding transmitted path 2×2 optical switch 218, which then switches the dummy signal to the waveband multiplexer 214 for the first output to the Branch Terminal C 232, as indicated by the path using dashed arrows. The multiplexer combines it with other signals for Branch Terminal C 232 and returns it to Branch Terminal C 232. By doing this, the amplifier power level is maintained. In one embodiment, the dummy light 234, 236 for the "branch terminal to BU" path may be reused in the "BU to branch terminal" path.

In one embodiment, a similar operation may be performed between Branch Terminal C 232 and Trunk Terminal B 230 through the other bidirectional fiber pair. After being demultiplexed at a demultiplexer 240, the dummy signal 236 may travel along the path indicated by the dash-dot arrows through two 2×2 optical switches 220 and 219 and may return to the Branch Terminal C 232 after multiplexing by a multiplexer 216. In this switching operation, each signal may pass through the demultiplexer 240 and the multiplexer 216 once, and may pass through the optical switches 220 and 219 twice. Since the dummy light is only used for power level balancing in this embodiment, only one light source is needed for each waveband, even if the waveband normally contains multiple WDM channels. The combined power of this dummy light source is similar to the total power of all WDM channels within the waveband. While the above architecture and switch configuration is illustratively shown, it is contemplated that other sorts of hardware, architectures, and configurations may also be employed according to the present principles.

In another embodiment according to the present principles, when a particular waveband is used to communicate between a trunk terminal and the branch terminal (such as A⇔C), a set of four corresponding 2×2 optical switches (e.g., 222, 223, 224, 225) are set to a cross state. The same waveband may also be employed to communicate between the Branch Terminal C 232 and the other Trunk Terminal (e.g., Trunk Terminal B 230, such that B⇔C), which is a feature enabled by having double fiber pairs between the BU 200 and the Branch Terminal C 232. This is illustrated by the last wavebands (i.e., the right-most wavebands, 242 and 244) at Trunk Terminals A 200 and C 232, and the last wavebands (i.e., the right-most wavebands, 246 and 248) at Trunk Terminals B 230 and C 232.

For the communication between Trunk Terminal A 206 and Branch Terminal C 232, the input from Trunk Terminal A 206 may be firstly demultiplexed by a demultiplexer 208, and then the waveband of interest (242 in this example) may be switched by the 2×2 optical switch 222 to a multiplexer 214 to go to the first output fiber to the Branch Terminal C 232. This is indicated by the solid arrows. The corresponding reverse signal 244 from Branch Terminal C 232 to Trunk Terminal A 206 may also be demultiplexed and then switched by a reverse direction 2×2 optical switch 225 to the multiplexer to go to the trunk path for Trunk Terminal A, as indicated by dashed arrows. In this switching operation according to one embodiment, each signal passes through the demultiplexer 208 and the multiplexer 214 once, and passes through the optical switch only once (compared to twice for the communication between trunk terminals). The difference in one optical switch stage will not cause much insertion loss difference, since the insertion loss of a 2×2 optical switch is typically, for example, only 0.5 dB~1 dB.

For the communication between Trunk Terminal B 230 and Branch Terminal C 232, the input from Trunk Terminal B 230 may be firstly demultiplexed by a demultiplexer 252, and then the waveband of interest (246 in this example) may be switched by the 2×2 optical switch 223 to a multiplexer 216 to go to the second output fiber to the Branch Terminal C 232. The corresponding reverse signal 248 from Branch Terminal C 232 to Trunk Terminal B 230 may also be demultiplexed and then switched by a reverse direction 2×2 optical switch 224 to the multiplexer to go to the trunk path for Trunk Terminal B, as indicated by dashed dot arrows. In this switching operation according to one embodiment, each signal passes through the demultiplexer 252 and the multiplexer 216 once, and passes through the optical switch only once (compared to twice for the communication between trunk terminals). The difference in one optical switch stage will not cause much insertion loss difference, since the insertion loss of a 2×2 optical switch is typically, for example, only 0.5 dB~1 dB.

In one embodiment, this operation employs a set of four corresponding switches (e.g., 222, 223, 224, 225) for the waveband, and also sets up a close fiber loop. No signal is transmitted in this empty loop. If the same waveband is used for both bidirectional A⇔C and B⇔C links, then no dummy light 234, 236 is needed for this waveband because all four fibers pairs contain useful signals. If only one directional link contains useful signal, a dummy light 234, 236 may be employed in the two fiber pairs for the other bidirectional link. While the above architecture is illustratively shown, it is contemplated that other sorts of hardware, architectures, and configurations may also be employed according to the present principles.

For example, in one embodiment according to the present principles, the bidirectional DSM reconfigurable BU employs four units of waveband/wavelength demultiplexers and another four multiplexers. If the WDM signals are divided into M wavebands (or wavelengths), the BU will require 4×M units of 2×2 optical switches. The insertion loss of the signal induced by these components is typically 8 dB or less. This is comparable to the conventional fixed BU using filters and couplers. Therefore no additional optical amplification is required. These two main optical components, namely the multiplexer/demultiplexer and the 2×2 optical switch, are commercially available, and each of them can be constructed using various types of mature technologies.

For the wavelength demultiplexer/multiplexer, a common technology is to use arrayed waveguide grating (AWG), which is based on PLC technology. The same technology can be used to make waveband demultiplexer/multiplexer. However since a waveband demultiplexer/multiplexer has much fewer output ports, it can be constructed using cascaded fixed waveband filters. Waveband filters with different channel grids, such as 50 GHz, 100 GHz and 200 GHz, and different configurations, such as 2-skip-0, 4-skip-0, and 8-skip-0, are commercially available (an x-skip-y filter means that the filter passband covers x channels, and y channels on each side of the passband are not used due to the slope of the passband edge). They offer wide and flat-top passband profiles, making it suitable for the waveband demultiplexer/multiplexer application. Regardless of the technology employed to construct a demultiplexer/multiplexer, the demultiplexer/multiplexer is passive when employed according to the present principles, and therefore is always capable of "latching".

In one embodiment according to the present principles, for the 2×2 optical switch, commercial products based on many technologies are available, including stepper motor, prism, MEMS, MOM (miniature opto-mechanical), magneto-optic, electro-optic solid state, electro-optic $LiNbO_3$, thereto-optic, PLZT (polarized lead zirconium titanate, acousto-optic, and so on. Among them, several technologies can provide latching features, which are mainly based on mechanical switching, such as the stepper motor, MOM and prism switches. The insertion loss figures of these switches are typically from, for example, 0.5 dB to 1 dB, and the PDL values are typically <0.1 dB. The crosstalk is typically greater than 60 dB, and repeatability is typically ±0.02 dB. The switching times are 10 ms or less. Most of these switches have durability of greater than 10 million cycles, making them suitable for application in submarine networks. As such, the bidirectional DSM reconfigurable BU architecture according to the present principles may be constructed using commercially available components, and can deliver latching performance. While the above device configurations are illustratively shown, it is contemplated that other device configurations may be employed according to the present principles.

In one embodiment according to the present principles, although the BU requires 4×M units of 2×2 optical switches, the number of electrical controller circuitry can by only M. This is because the four switches for each waveband (e.g., 222, 223, 224, 225) are operated concurrently (e.g., all bar state or all cross state), and as such, a common controller can be used to drive all the four of them. This feature also reduces the cost of the electrical hardware. Besides basic reconfigurable optical add/drop multiplexer (ROADM) operations, additional functions, such as optical power monitoring and equalization can be performed by adding relevant devices. This architecture can also be reconfigured to add redundant components for protection purpose, or be reconfigured for a BU with higher port count (i.e., capable of connecting to more branch terminals).

In one embodiment, the available combination of switching configuration may be $2^M$. If it operates at the per-wavelength level on a k-channel WDM system, then M is the same as k, and this architecture will offer the same switching capability as the WSS-based BU architecture, which is the maximum level. As discussed earlier, employing waveband level architectures may reduce the hardware component quantity and thus the cost and size of the BU. It may also post some restriction on wavelength routing, because all channels within the same waveband need to be switched together. An efficient routing and wavelength/waveband assignment scheme helps to relax this restriction, reduce blocking, and provide better network throughput. Such algorithms or schemes have been studied extensively for the terrestrial hierarchical multi-granular (fiber, waveband, wavelength granularities) networks. Since the submarine network is typically simpler than the terrestrial network (fewer nodes in the network, fewer degrees per node), the existing schemes can be applied effectively according to the present principles.

Figure 3:
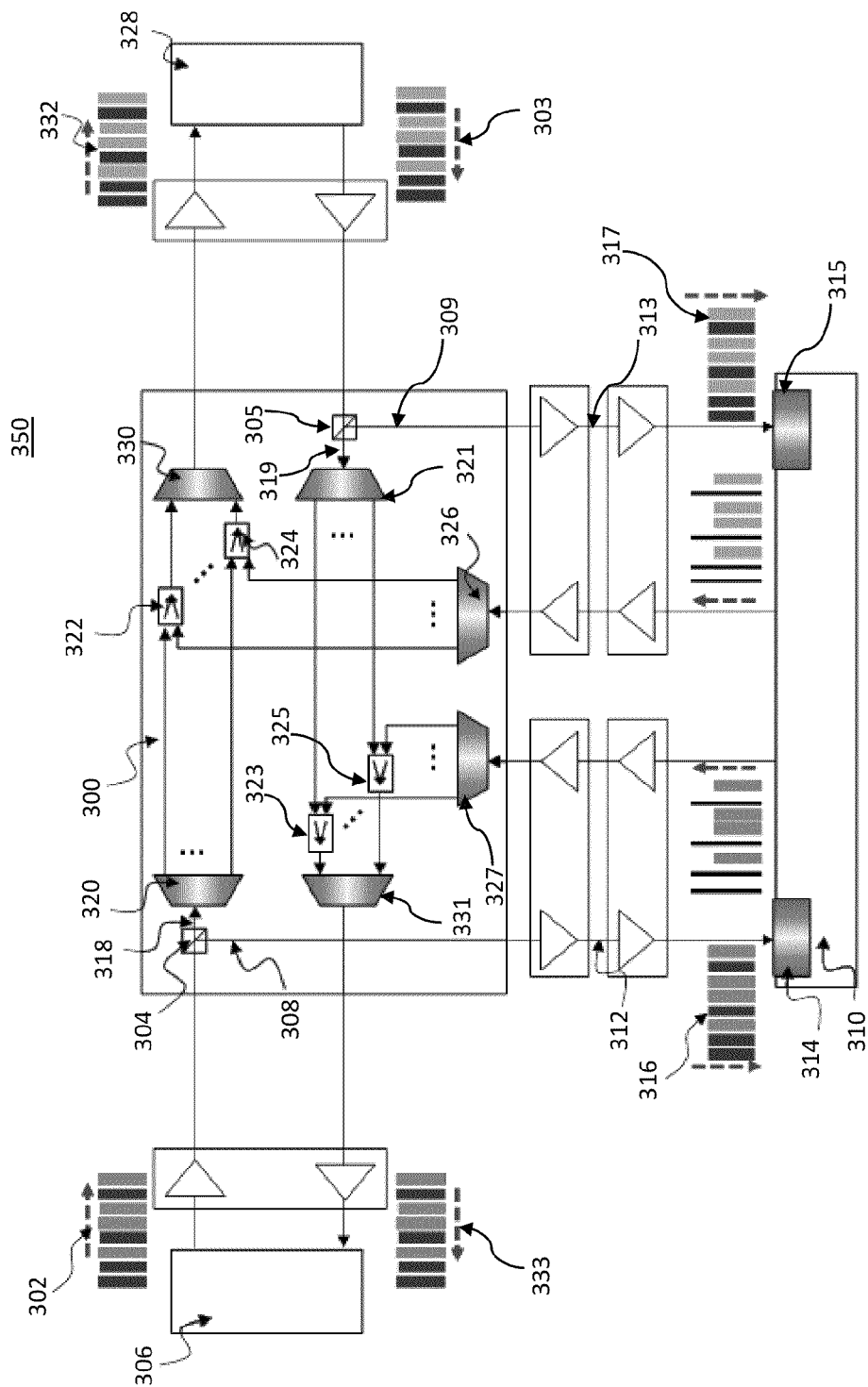
FIG. 3 shows a split-and-select (S&S) and demultiplexer-switch-multiplexer (DSM) based reconfigurable branching unit (BU) system in accordance with an embodiment of the present principles.

Referring now to FIG. 3, a split-and-select (S&S) DSM architecture 350 is illustratively shown in one embodiment according to the present principles. In one embodiment according to the present principles, a reconfigurable BU architecture uses a split-and-select architecture, similar to the WSS-based architecture. However it does not employ WSS in the BU 300, and it can be constructed using commercially available latching devices. It also has a DSM configuration, similar to the bidirectional DSM architecture, but it requires fewer components in the BU 300 and has lower optical loss for the signal passing through the BU 300.

In one embodiment according to the present principles, options of waveband operation or wavelength operation are both supported. Because of the limitation in the hardware size in the BU 300, it may be desirable to employ waveband instead of wavelength to reduce the demultiplexer port count and the quantity of optical switches. As such, we will discuss only the waveband switching option hereinafter for simplicity, unless otherwise stated. However, it is contemplated that the present principles advantageously apply to both waveband level and wavelength level operations. Wavelength/waveband demultiplexers/multiplexers with the same wavelength/waveband assignment may be employed at appropriate output ports to separate or combine signals from/to different sources. In the waveband option, the optical signals within the same band may be switched together and may not be treated individually until reaching the destination terminal. The channels at each waveband may be assigned contiguously or in periodic fashion. Non-uniform wavebands may also be used to improve aggregation efficiency, as long as all waveband demultiplexers in the BU have the same waveband assignment configuration.

In one embodiment, the present principles also offer a high level of flexibility (e.g., 1024 available configurations) as compared with conventional BU architectures (e.g., ~16 configurations). The present principles also employ a highly desirable latching feature using commercially available mature components, and therefore may be easily implemented. Multicasting operations may also be performed through this BU, and the architecture according to the present principles is also future proof for flexible grid WDM network operation.

In one embodiment according to the present principles, the S&S+DSM reconfigurable BU architecture 350 includes a BU 300, an input signal 302 arrives from Trunk Terminal A 306 may first be split by a 1:2 optical splitter 304 into two paths. One path 308 exits the BU 300 and is sent to Branch Terminal C 310 through a branch path 312. At Branch Terminal C 310, a waveband/wavelength blocker 314 may be employed to select only the channels of interest 316 (e.g., particular wavebands in a spectrum). The waveband blocker 314 has a similar function as a wavelength blocker (not shown), except that a waveband operates on a waveband granularity, and therefore employs fewer switching/blocking elements.

In one embodiment, a second path 318 from an optical splitter 304 may enter a waveband/wavelength demultiplexer 320 and may be separated into different wavebands (or individual wavelengths). Each waveband may then enter a respective 2×1 optical switch 322, 324. The other input of the 2×1 optical switch may be the demultiplexed signal from the Branch Terminal 310, and may be demultiplexed by a waveband demultiplexer 326 at an input from the Branch Terminal 310; and it may also contain the same waveband. The 2×1 optical switch 322, 324 selects which signal will be transmitted to the destination trunk terminal 328. At the BU output for the trunk terminal, all wavebands may be combined, using a waveband multiplexer 330, into a WDM signal 332 and may then exit the BU 300. In essence, the 2×1 optical switches 322, 324 in this architecture according to the present principles decide whether the respective waveband will be used for "trunk terminal to trunk terminal" connections or for "trunk terminals to branch terminal" connections.

In one embodiment, a similar setup may be employed for the reverse direction path in which an input signal 303 arrives from Trunk Terminal B 328, and the input signal 303 may first be split by a 1:2 optical splitter 305 into two paths. One path 309 exits the BU 300 and is sent to Branch Terminal C 310 through a branch path 313. At Branch Terminal C 310, a waveband/wavelength blocker 315 may be employed to select only the channels of interest 317 (e.g., particular wavebands in a spectrum). The waveband blocker 315 has a similar function as a wavelength blocker (not shown), except that a waveband operates on a waveband granularity, and therefore employs fewer switching/blocking elements.

In one embodiment, a second path 319 from an optical splitter 305 may enter a waveband/wavelength demultiplexer 321 and may be separated into different wavebands (or individual wavelengths). Each waveband may then enter a respective 2×1 optical switch 323, 325. The other input of the 2×1 optical switch may be the demultiplexed signal from the Branch Terminal 310, and may be demultiplexed by a waveband demultiplexer 327 at an input from the Branch Terminal 310; and it may also contain the same waveband. The 2×1 optical switch 323, 325 selects which signal will be transmitted to the destination trunk terminal 306. At the BU output for the trunk terminal, all wavebands may be combined, using a waveband multiplexer 331, into a WDM signal 333 and may then exit the BU 300.

In one embodiment, commercial products based on different technologies are available for use as the 2×1 optical switches 322, 324; including stepper motors, prisms, microelectromechanical systems (MEMS), miniature opto-mechanical (MOM) systems, magneto-optic, electro-optic solid state, electro-optic $LiNbO_3$, thermo-optic, polarized lead zirconium titanate (PLZT) systems, acousto-optic systems, etc. Among these systems, several technologies can provide latching features, which are mainly based on mechanical switching, such as, for example, the stepper motor, MOM and prism switches. The insertion loss figures of these switches are typically, for example, from 0.3 dB to 0.6 dB, and the PDL values are typically <0.1 dB. The crosstalk is typically greater than 60 dB, and repeatability is typically ±0.02 dB. The switching times are 10 ms or less, and most of these switches have durability of greater than 10 million cycles, which makes them suitable for application in submarine networks. While the above switching systems and configurations are illustratively shown, it is contemplated that other sorts of switching systems and configurations may be employed according to the present principles.

In one embodiment according to the present principles, the S&S and DSM reconfigurable BU architecture advantageously allows the reuse of the same wavelength/waveband in the two fiber pairs between the BU and the branch terminal for connections between the two trunk terminals to the branch terminal. For example, having equal power among all waveband/wavelength across the spectrum in the fiber exiting the BU is important to keep amplifier power balance (the power balance of the signal entering the BU is taken care of at the terminal, so it is not required to be handled by the BU). In this architecture, the output power is naturally balanced. For the two fiber paths from the BU to the branch terminal, since the signal directly comes from the optical splitter, there is no switching or channel add/drop by the BU, and therefore the equalized property of the signal from the respective trunk terminal is also present. For the two fiber paths from the BU to the trunk terminals, each waveband may be passed through an optical splitter, a waveband demultiplexer, a 2×1 optical switch, and a waveband multiplexer, and therefore, they experience the same amount of loss. As such, the output power remains uniform. Depending on the system design and amplifier requirement, the split ratio of the 2:1 splitters may advantageously be set to deliver the optimum levels between the two paths.

Due to the S&S configuration in one embodiment, a multicasting feature is available. The same channels from the trunk terminal may be switched to both the branch terminal and the destination trunk terminal simultaneously by controlling the respective band in the waveband blocker and the respective 2×1 optical switch. If the multicasting feature is not used, the two corresponding 2×1 optical switches in the forward path and the reverse path in the BU may be controlled concurrently through a common controller. However if multicasting operation is performed, these two switches may have different switching states at the same time, therefore a separate controller may be employed. When employing this embodiment of the architecture, the available combination of switching configuration is $2^M$ without considering multicasting. If it operates at the per-wavelength level on a k-channel WDM system, then M is the same as k, and this architecture will offer the same full switching capability as the WSS-based BU architecture. When the multicasting function is allowed, the number of available configurations will be even higher.

In one embodiment, besides the basic ROADM operations, additional functions, such as optical power monitoring and equalization can be performed by adding relevant devices. This architecture can also be reconfigured to add redundant components for protection purpose, or be reconfigured for BU with higher port count (connecting to more branch terminals). Although the architecture in this embodiment also offers bidirectional ROADM function, there is no connection required between the forward direction optics and the reverse direction optics in this embodiment (as compared to the bidirectional DSM architecture discussed above, where the each 2×2 optical switches may be employed for both forward and reverse direction traffic). While the above architecture and configuration is illustratively shown, it is contemplated that other sorts of architectures and configurations may be employed according to the present principles.

Figure 4:
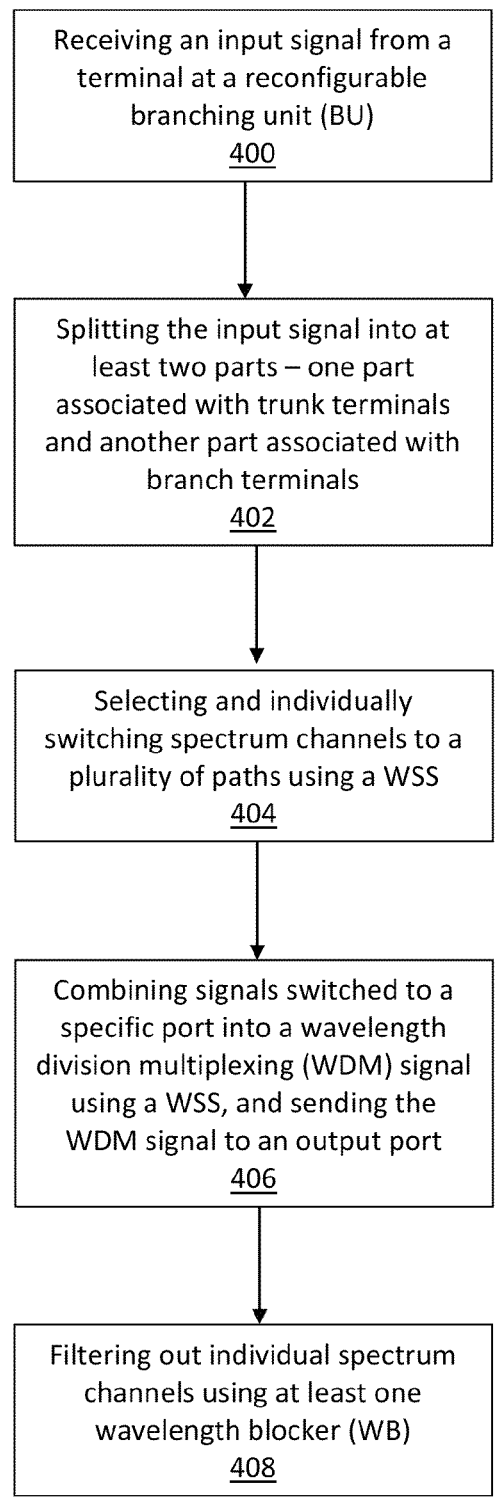
FIG. 4 is a block/flow diagram of a system/method for a wavelength-selective switch (WSS) based reconfigurable branching unit (BU) system in accordance with an embodiment of the present principles.

Referring now to FIG. 4, a block/flow diagram of a system/method for a wavelength-selective switch (WSS) based reconfigurable branching unit (BU) is illustratively shown in accordance with an embodiment of the present principles. An input signal from a terminal at a reconfigurable branching unit (BU) in block 400. The input signal is split into at least two parts in block 402, with one part being associated with one or more trunk terminals and another part being associated with one or more branch terminals. In block 404, each of one or more spectrum channels are selected and individually switched to one of a plurality of paths using at least one wavelength selective switch (WSS), with the at least one WSS being configured to transmit the one or more spectrum channels to their respective target output port. In block 406, signals switched to a specific port are combined into a wavelength division multiplexing (WDM) signal using the WSS, and the WDM signal is sent to an output port. In block 408, at least one wavelength blocker (WB) filters out individual spectrum channels. While the above method and architecture is illustratively shown according to the present principles, it is contemplated that other methods and architectures may also be employed according to the present principles.

Figure 5:
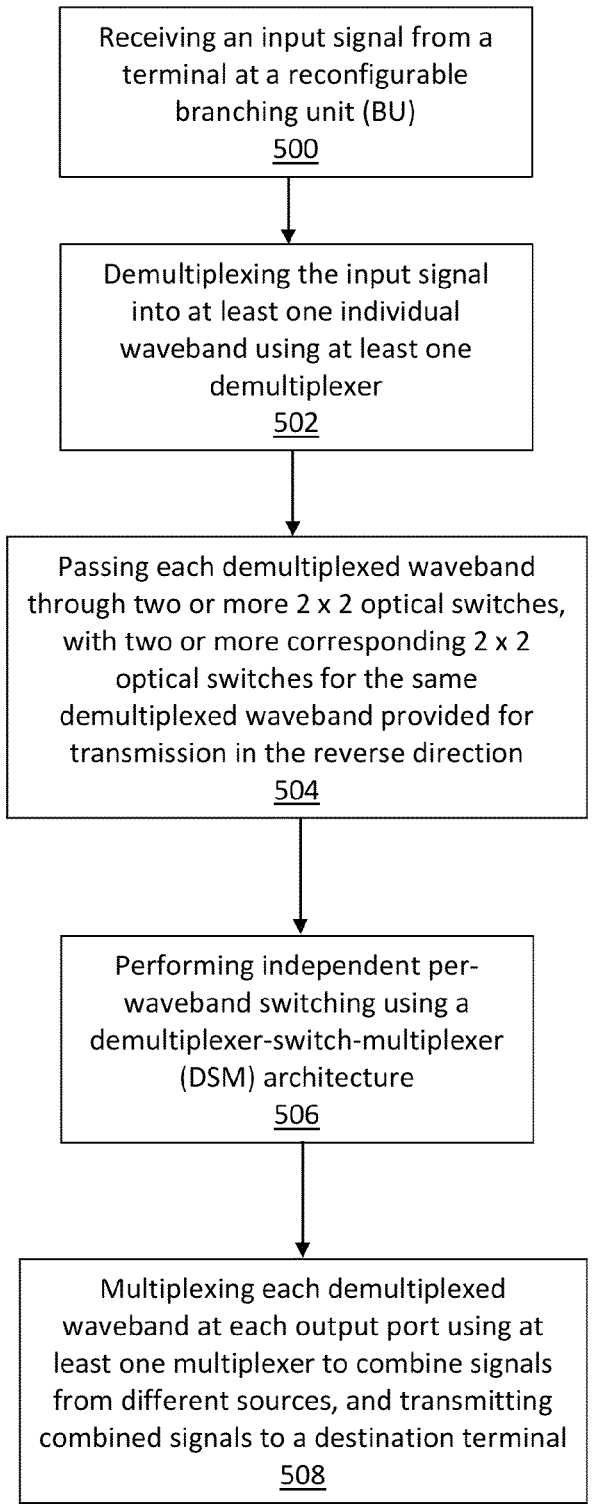
FIG. 5 is a block/flow diagram of a system/method for a bidirectional demultiplexer-switch-multiplexer (DSM) based reconfigurable branching unit (BU) in accordance with an embodiment of the present principles.

Referring now to FIG. 5, a block/flow diagram of a system/method for a bidirectional demultiplexer-switch-multiplexer (DSM) based reconfigurable branching unit (BU) is illustratively shown in accordance with an embodiment of the present principles. In block 500, an input signal is received from a terminal at a reconfigurable branching unit, wherein the BU enables bidirectional transmission between any two terminals. In block 502, the input signal is demultiplexed into at least one individual waveband using at least one demultiplexer; passing each demultiplexed waveband through two or more 2×2 optical switches, with two or more corresponding 2×2 optical switches for the same demultiplexed waveband provided for transmission in the reverse direction, wherein the optical switches are interlinked, operate concurrently, and have the same switching state. In block 506, independent per-waveband switching is performed using a demultiplexer-switch-multiplexer (DSM) architecture. In block 508, each demultiplexed waveband is multiplexed at each output port using at least one multiplexer to combine signals from different sources, and the combined signals are transmitted to a destination terminal. While the above method and architecture is illustratively shown according to the present principles, it is contemplated that other methods and architectures may also be employed according to the present principles.

Figure 6:
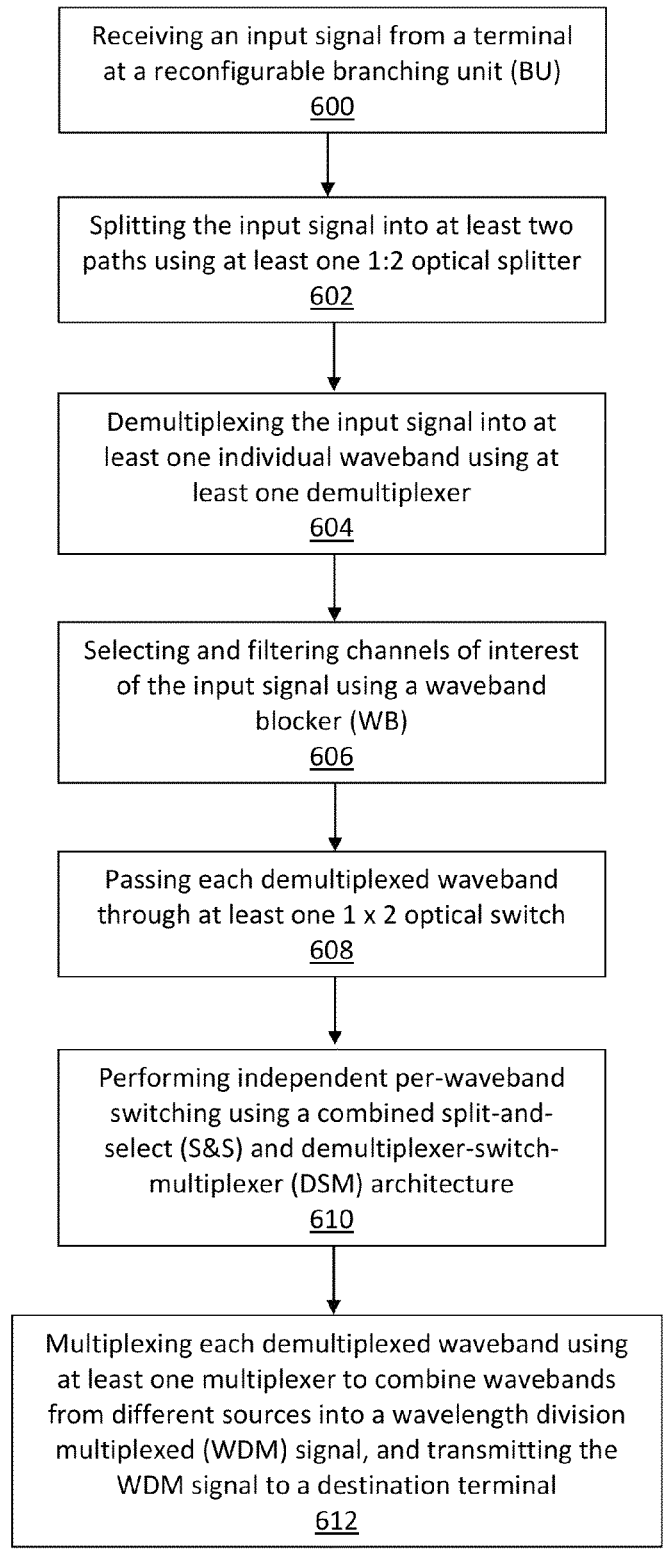
FIG. 6 is a block/flow diagram of a system/method for a split-and-select (S&S) and demultiplexer-switch-multiplexer (DSM) based reconfigurable branching unit (BU) system in accordance with an embodiment of the present principles.

Referring now to FIG. 6, a block/flow diagram of a system/method for a split-and-select (S&S) and demultiplexer-switch-multiplexer (DSM) based reconfigurable branching unit (BU) system is illustratively shown in accordance with an embodiment of the present principles. In block 600, an input signal is received from a terminal at a reconfigurable branching unit (BU). In block 602, the input signal is split into at least two paths using at least one 1:2 optical splitter. The input signal is then demultiplexed in block 604 into at least one individual waveband using at least one demultiplexer. Channels of interest of the input signal are selected in filtered in block 606 using a waveband blocker (WB). In block 608, each demultiplexed waveband is passed through at least one 1×2 optical switch, with at least one corresponding 1×2 optical switch being provided for transmission of the same demultiplexed waveband in the reverse direction. Independent per-waveband switching is performed in block 610 using a combined split-and-select (S&S) and demultiplexer-switch-multiplexer (DSM) architecture. In block 612, each demultiplexed waveband is multiplexed using at least one multiplexer to combine wavebands from different sources into a wavelength division multiplexed (WDM) signal, and transmitting the WDM signal to a destination terminal. While the above method and architecture is illustratively shown according to the present principles, it is contemplated that other methods and architectures may also be employed according to the present principles.

It should be recognized that the present principles are not limited to the particular embodiments described above. Rather, numerous other embodiments of submarine optical communication networks with reconfigurable BUs may also be employed in accordance with the present principles.

Having described preferred embodiments of a system and method for providing mobile computing services (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for optical communication with a submarine optical network, comprising:
   receiving an input signal from a terminal at a reconfigurable branching unit (BU), wherein the BU enables bidirectional transmission between any two terminals;
   demultiplexing the input signal into at least one individual waveband using at least one demultiplexer;
   passing each demultiplexed waveband through two or more 2×2 optical switches, with two or more corresponding 2×2 optical switches for the same demultiplexed waveband provided for transmission in the reverse direction, wherein the optical switches are interlinked, operate concurrently, and have the same switching state;
   performing independent per-waveband switching using a demultiplexer-switch-multiplexer (DSM) architecture; and
   multiplexing each demultiplexed waveband at each output port using at least one multiplexer to combine signals from different sources, and transmitting combined signals to a destination terminal;
   signal switching and dummy light reuse with an interconnected bidirectional architecture and a dual fiber pair between the BU and the branch terminal that allows spectrum reuse between two trunk terminal to branch terminal paths, wherein the dummy light enables amplifier power balancing; and
   switching waveband to reduce hardware and enables flexible grid network operation with a uniform loss that offers automatic optical power equalization.

2. The method of claim 1, wherein the two or more 2×2 optical switches are employed to achieve latching.

3. The method of claim 1, wherein each signal passes through each of the at least one demultiplexer, the at least one multiplexer, and the two or more 2×2 optical switches at least once.

4. The method of claim 1, wherein the input signal is demultiplexed into at least one individual wavelength using the at least one demultiplexer.

5. A system for optical communication comprising:
   a reconfigurable branching unit (BU), configured to receive an input signal from a terminal, wherein the BU enables bidirectional transmission between any two terminals;
   at least one demultiplexer configured to demultiplex the input signal into at least one individual waveband;
   two or more 2×2 optical switches configured to pass each demultiplexed waveband through the two or more 2×2 optical switches, with two or more corresponding 2×2 optical switches for the same demultiplexed waveband provided for transmission in the reverse direction, wherein the optical switches are interlinked, operate concurrently, and have the same switching state;
   a demultiplexer-switch-multiplexer (DSM) architecture configured to perform independent per-waveband switching; and
   at least one multiplexer configured to combine signals from different sources by multiplexing each demultiplexed waveband at each output port, and transmitting combined signals to a destination terminal, wherein signal switching is done with an interconnected bidirectional architecture and a dual fiber pair between the BU and the branch terminal that allows spectrum reuse between two trunk terminal to branch terminal paths, wherein the dummy light enables amplifier power balancing and waveband switching reduces hardware and enables flexible grid network operation with a uniform loss that offers automatic optical power equalization.

6. The system of claim 5, wherein an optical network is a submarine optical network.

7. The system of claim 5, wherein the two or more 2×2 optical switches are employed to achieve latching.

8. The system of claim 5, wherein each of the at least one demultiplexer, at least one multiplexer, and the two or more 2×2 optical switches pass each signal through at least once.

9. The system of claim 5, wherein the at least one demultiplexer demultiplexes the input signal into at least one individual wavelength.

10. A method for optical communication comprising:
    receiving an input signal from a terminal at a reconfigurable branching unit (BU);
    splitting the input signal into at least two paths using at least one 1:2 optical splitter;
    demultiplexing the input signal into at least one individual waveband using at least one demultiplexer;
    selecting and filtering channels of interest of the input signal using a waveband blocker (WB);
    passing each demultiplexed waveband through at least one 1×2 optical switch, with at least one corresponding 1×2 optical switch being provided for transmission of the same demultiplexed waveband in the reverse direction;
    performing independent per-waveband switching using a combined split-and-select (S&S) and demultiplexer-switch-multiplexer (DSM) architecture; and
    multiplexing each demultiplexed waveband using at least one multiplexer to combine wavebands from different sources into a wavelength division multiplexed (WDM) signal, and transmitting the WDM signal to a destination terminal;
    signal switching and dummy light reuse with an interconnected bidirectional architecture and a dual fiber pair between the BU and the branch terminal that allows spectrum reuse between two trunk terminal to branch terminal paths, wherein the dummy light enables amplifier power balancing; and
    switching waveband to reduce hardware and enables flexible grid network operation with a uniform loss that offers automatic optical power equalization.

11. The method of claim 10, wherein an optical network is a submarine optical network.

12. The method of claim 10, wherein latching is achieved by employing at least one passive, static multiplexer and at least one passive, static demultiplexer.

13. The method of claim 10, wherein one or more latching 1×2 optical switch is employed to achieve latching.

14. The method of claim 10, wherein the input signal is demultiplexed into at least one individual wavelength using the at least one demultiplexer.

* * * * *